May 23, 1967  E. M. MILLER  3,321,225
FISHERMAN'S TOOL
Filed Sept. 13, 1965

INVENTOR.
EVELYN M. MILLER
BY
ATTORNEY

United States Patent Office 3,321,225
Patented May 23, 1967

3,321,225
FISHERMAN'S TOOL
Evelyn M. Miller, 1404 1st Ave. NE.,
Cedar Rapids, Iowa 52401
Filed Sept. 13, 1965, Ser. No. 486,871
5 Claims. (Cl. 289—17)

ABSTRACT OF THE DISCLOSURE

This invention describes a readily transportable tool by which a fisherman can easily and professionally fasten a leader to a fishing hook by way of a knot known in the art as a snell. The device consists of a V shaped member made of a resilient material having a pair of hollow smooth surface holding means on the open ends thereof, the holding means being capable of rotatably holding a bobbin. The hook to be snelled is supported by the bobbin which can then be rotated within the holding means by the fisherman.

---

This invention relates generally to a fisherman's tool and particularly to a device which enables a fisherman to snell his own hook.

The act of tying a leader to a fishing hook by use of a knot and twist is called snelling by those skilled in the art.

There has long existed in the art the need for a device which is easily transportable in a tackle box and which enables a fisherman to quickly and simply snell his own fishing hooks in a manner which will eliminate the possibility of the knot slipping and which will not break below the tensile strength of the string. A professionally snelled hook has several wraps of string around the hook and the string is passed through the eye of the hook and also a loop formed by the string. This assures a slip-free knot. Such a tie is strong because any force applied to the hook is not transferred to the string at a single strand of the string as it is if the string is simply passed through the eye of the hook and tied.

It is therefore an object of this invention to provide a manually operable device for tying leader strings to fishing hooks.

It is another object of this invention to provide a device which is readily transportable and simple to use.

It is another object of this invention to provide a device which enables fishermen to snell their hook in a professional-like manner.

Further objects, features, and advantages of the invention will become apparent from the following description and claims when read in view of the accompanying drawings wherein like numbers indicate like parts and in which:

Figure 1:
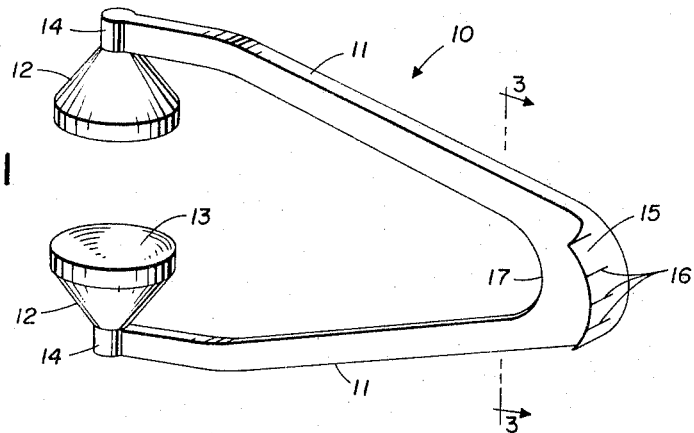
FIGURE 1 is a pictorial representation of a preferred embodiment of the invention.
Figure 3:
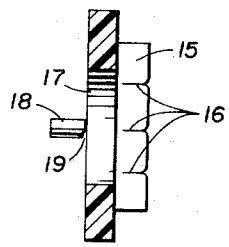
FIGURE 3 is a sectional view taken along line 3—3 of FIGURE 1.

Referring now to FIGURE 1 which shows a preferred embodiment of the fisherman's tool 10 which comprises this invention. A V-shaped member 11 is constructed of a resilient material such that the open ends 14 of member 11 can be readily biased together by a pressure applied along the axes connecting the ends 14. Member 11 can be made of plastic, metal, wood, or any other slightly resilient material. Rigidly attached to ends 14 are conical-shaped holding members 12. Holding members 12 are partially hollowed at surfaces 13 such that they readily and positively will hold a spherical member. Rigidly attached to the closed end 17 of member 11 is a guide means 15 containing cuts or serrations 16. As best shown in FIGURE 3, a pin 18 is rigidly attached to member 11 on the side opposite from guide 15. Pin 18 contains a slot 19 at the base thereof.

Figure 2:
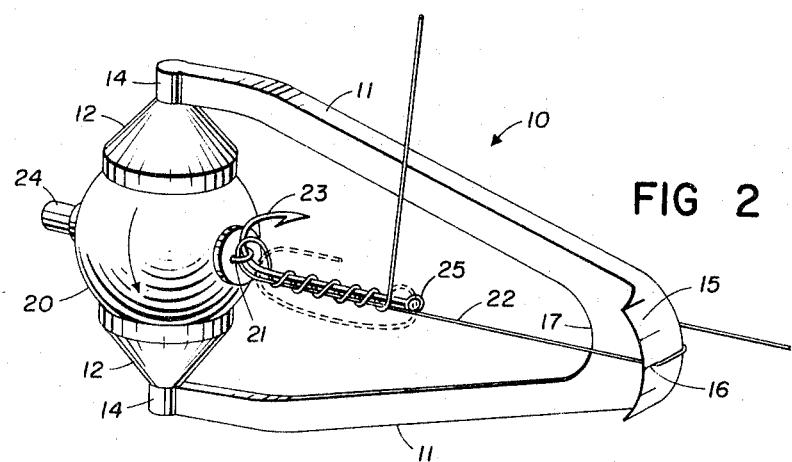
FIGURE 2 shows the manner in which the device is used.

The operation of the instant invention is best shown by reference to FIGURE 2. An ordinary fisherman's bobbin 20 of the type well-known in the art is inserted between the conical holding means 12. A hook 23 is then placed through the loop 21 contained in the bobbin. Loop 21 is the wire loop normally found on a bobbin which is used to attach the string thereto. In the bobbin shown, loop 21 can be moved outwardly by applying pressure to knob 24. This feature, however, is not essential to the intended use of the invention.

Also passing through loop 21 is a fisherman's line 22 which it is desired to attach to hook 23. It should be noted that a portion of string 22 lies parallel with the shank of hook 23. After passing through loop 21 the short end of the string is taken to the side of tool 10 where it is held by the thumb of the operator. The long end of the string is inserted into one of the slots 16 in guide member 15 and then looped around pin 18 where it is held by slot 19.

Pin 18 and slot 19 merely prevent slippage of string 22 as the hook is snelled. Slot 16 also holds the string and therefore pin 18 and slot 19 are not essential.

As the short end of the string 22 is guided downwardly along the hook by the thumb the other hand of the operator is used to rotate bobbin 20 about an axis parallel to string 22 so that the string is twisted around the portion of the string which lies parallel to the shank of the hook. This is preferably done six or eight times so that a substantial snell is formed on the hook.

At the completion of the twisting operation the end of the cord is passed through the eye 25 of hook 23. It is then passed through the loop in the string which is formed by passing the string through loop 21 of bobbin 20. These steps are shown in dotted lines in FIGURE 2. The snell is then tightened by simultaneously pulling both ends of string 22 away from eye 25 of hook 23.

A more simple, but somewhat less desirable, tie can also be made by use of this invention. To make this tie the hook and bobbin are placed as shown in FIGURE 2. The string is immediately passed through 25 of hook 23. Both ends of string 22 are then inserted in different ones of slot 16. The bobbin is then rotated several times to twist the string. At the completion of rotation the short end of the string is passed through the last twist and eye 25. Boh ends of the string are then pulled to tighten the knot and a simple overhand is then added to assure a permanent knot.

Although this invention has been described with respect to particular embodiments thereof, it is not to be so limited, as changes and modifications may be made therein which are within the spirit and scope of the invention as defined by the appended claims.

I claim:

1. A fishing tool comprising; a plurality of elongated members, said members being resiliently connected at one end, a plurality of smooth surfaced cup-shaped holding means so that a spherical member can be rotatably held by said holding means, each of said holding means being rigidly attached to one of said elongated members.

2. The device of claim 1 including a guide means cooperatively associated with said holding means.

3. The device of claim 2 including means having a slot for holding a string.

4. A fishing tool comprising a resilient V-shaped member, holding members attached to the free ends of said V-shaped member, said holding means being partially hollow so they can hold a spherical member, guide means positioned near the closed end of said V-shaped member, and a pin positioned in the proximity of said guide means.

5. The device of claim 4 wherein said guide means is a slotted substantially flat member attached to one side of said V-shaped member and said pin is slotted and is attached to the other side of said V-shaped member.

References Cited by the Examiner

UNITED STATES PATENTS

| 1,910,750 | 5/1933 | Clark | 81—5.1 |
| 2,734,299 | 2/1956 | Masson | 289—17 |

MERVIN STEIN, *Primary Examiner.*

LOUIS K. RIMRODT, *Examiner.*